(12) United States Patent
Zhan

(10) Patent No.: US 12,412,545 B2
(45) Date of Patent: Sep. 9, 2025

(54) DRIVE CIRCUIT AND CONTROL METHOD THEREOF, AND STORAGE MEDIUM

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventor: Zhiming Zhan, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/758,228

(22) PCT Filed: May 31, 2022

(86) PCT No.: PCT/CN2022/096419
§ 371 (c)(1),
(2) Date: Jun. 30, 2022

(87) PCT Pub. No.: WO2023/221175
PCT Pub. Date: Nov. 23, 2023

(65) Prior Publication Data
US 2024/0203374 A1   Jun. 20, 2024

(30) Foreign Application Priority Data
May 16, 2022  (CN) .......................... 202210529276.3

(51) Int. Cl.
*G09G 3/36* (2006.01)
*G09G 3/20* (2006.01)

(52) U.S. Cl.
CPC ............. *G09G 3/3677* (2013.01); *G09G 3/20* (2013.01); *G09G 3/36* (2013.01); *G09G 3/3611* (2013.01);
(Continued)

(58) Field of Classification Search
CPC .......... G09G 3/20; G09G 3/36; G09G 3/3611; G09G 3/3674; G09G 3/3677;
(Continued)

(56) References Cited

U.S. PATENT DOCUMENTS 9,087,596 B2 * 7/2015 Su .................. G09G 3/3659
11,741,880 B2 * 8/2023 Fang ................ G09G 3/2092
345/204
(Continued)

FOREIGN PATENT DOCUMENTS

CN  107039017 A  8/2017
CN  107369422 A  11/2017
(Continued)

OTHER PUBLICATIONS

International Search Report in International application No. PCT/CN2022/096419, mailed on Nov. 29, 2022.
(Continued)

*Primary Examiner* — Jason M Mandeville
(74) *Attorney, Agent, or Firm* — PV IP PC; Wei Te Chung

(57) ABSTRACT

A drive circuit and a control method thereof, and a storage medium are disclosed in the present disclosure. In the present disclosure, a clock signal is at a second level during an image blanking period, and a potential of a third node is reset to a low level, so that the switching transistor is subjected to a high point voltage or a high current for a shortened time, and the potential of the third node is pulled down early, thereby preventing a third switching transistor,
(Continued)

a fourth switching transistor, a sixteenth switching transistor, and a seventeenth switching transistor from being under the action of the high voltage or the high current for a long time.

14 Claims, 2 Drawing Sheets

(52) U.S. Cl.
CPC ....... *G09G 3/3696* (2013.01); *G09G 2310/02* (2013.01); *G09G 2310/0243* (2013.01); *G09G 2310/0286* (2013.01); *G09G 2310/08* (2013.01); *G09G 2320/045* (2013.01)

(58) Field of Classification Search
CPC ........... G09G 3/3696; G09G 2320/045; G09G 2310/02; G09G 2310/0243; G09G 2310/0286; G09G 2310/08; Y02D 10/00
USPC .......................................................... 345/87
See application file for complete search history.

(56) References Cited

U.S. PATENT DOCUMENTS

| | | | | |
|---|---|---|---|---|
| 2009/0304138 A1* | 12/2009 | Tsai | ........................ | G11C 19/28 377/79 |
| 2014/0103983 A1* | 4/2014 | Chang | .................... | H03K 3/015 327/198 |
| 2016/0351152 A1* | 12/2016 | Dai | ...................... | H01L 29/7869 |
| 2017/0084245 A1 | 3/2017 | Hwang et al. | | |
| 2017/0287425 A1* | 10/2017 | Koo | .......................... | G09G 5/18 |
| 2018/0211626 A1* | 7/2018 | Shi | ........................ | G09G 3/3677 |
| 2019/0057665 A1 | 2/2019 | Shi | | |
| 2021/0335301 A1* | 10/2021 | Liang | .................. | G06F 3/04166 |
| 2021/0407450 A1* | 12/2021 | Xi | ............................ | G09G 3/20 |
| 2022/0238056 A1* | 7/2022 | Liu | ........................ | G06F 3/0443 |
| 2022/0309976 A1* | 9/2022 | Hu | ......................... | G11C 19/28 |

FOREIGN PATENT DOCUMENTS

| | | |
|---|---|---|
| CN | 109935209 A | 6/2019 |
| CN | 113140187 A | 7/2021 |
| CN | 114067742 A | 2/2022 |
| CN | 114283726 A | 4/2022 |
| CN | 114283727 A | 4/2022 |
| JP | 2005221947 A | 8/2005 |

OTHER PUBLICATIONS

Written Opinion of the International Search Authority in International application No. PCT/CN2022/096419, mailed on Nov. 29, 2022.

Chinese Office Action issued in corresponding Chinese Patent Application No. 202210529276.3 dated Dec. 8, 2022, pp. 1-7.

* cited by examiner

DRIVE CIRCUIT AND CONTROL METHOD THEREOF, AND STORAGE MEDIUM

FIELD OF INVENTION

The present disclosure relates to a field of display technology, in particular to a drive circuit and a control method thereof, and a storage medium.

BACKGROUND OF INVENTION

Existing process architectures of a liquid crystal panel may be divided into two types: System on Chip (i.e., SOC) driver and Gate on Array (i.e., GOA) driver for driving scan lines, according to the gate driver design. From the perspective of product demand, it is also expected that the bezel is getting narrower and narrower. Therefore, compared with the SOC design, since the GOA driver has a smaller bezel width, which may omit the gate drive chip and reduce the cost, the liquid crystal panel with the GOA driver should be the mainstream trend in the future.

In practical products, control terminals of some switching tubes are applied with a high level for a long time, these switching tubes are subjected to voltage stress or current compressive stress for a longer time, and their volt-ampere characteristics are prone to drift, resulting in abnormal lighting.

It is especially pronounced in a high refresh rate display panel with a freesync function. The freesync function means that the refresh rate of the display may be adjusted down or up to be consistent with the frame rate of the game, thereby avoiding the occurrence of a screen tearing phenomenon. For example, for a display panel with a main frequency of 240 Hz, a process of converting the frequency to 60 Hz is to directly extend the CK blanking time from 0.1665 ms (240 Hz) to 12.654 ms (Freesync 60 Hz). This process is equivalent to changing the CK blanking time to 76 times of the original value, so the time of the switching tube voltage under the action of high point voltage or high current also becomes 76 times of the original time, which makes the drift of the I-V electrical characteristics of the switching tube more serious.

SUMMARY OF INVENTION

Technical Problem

An object of the present disclosure is to provide a drive circuit, a control method thereof, and a storage medium, and to effectively solve the problem that some switching tubes are applied with a high level for a long time, these switching tubes are subjected to high voltage or high current for a longer time, and their volt-ampere characteristics are prone to drift, resulting in abnormal lighting.

Technical Solution

According to an aspect of the present disclosure, the present disclosure provides a driving circuit for displaying an image, including a plurality of array substrate row driving units cascaded, wherein the plurality of array substrate row driving units are controlled by a clock signal and a frame start signal when displaying each of frame images, wherein at least one of the array substrate row driving units includes a pull-up control module, a first inverting module, a second inverting module, a first pull-down holding module, a second pull-down holding module, a pull-up module and a pull-down module; the pull-up control module receives a stage transmission signal and a scan driving signal transmitted by an array substrate row driving unit of a previous stage and is electrically connected to the first inverting module, the first inverting module and the first pull-down holding module are both electrically connected to a first node, the second pull-down holding module and the second inverting module are both electrically connected to a second node, the pull-up module and the pull-down module are both electrically connected to a third node, the pull-down module receives the frame start signal when displaying each of the frame images, the pull-up module receives the clock signal and outputs a scan driving signal of a current stage and a stage transmission signal of the current stage when displaying each of the frame images, and the first pull-down holding module and the second pull-down holding module are both electrically connected to an output terminal of the stage transmission signal of the current stage; wherein the clock signal has a first level, a second level, and a third level which are periodically set in timing, a potential of the second level is less than a potential of the first level and greater than a potential of the third level, and the clock signal is at the second level during an image blanking period.

Further, the pull-up control module includes a first transistor, wherein a control terminal of the first transistor receives the stage transmission signal transmitted by the array substrate row driving unit of the previous stage, a first terminal of the first transistor receives the scan driving signal transmitted by the array substrate row driving unit of the previous stage, and a second terminal of the first transistor is electrically connected to the first inverting module.

Further, the first inverting module includes a second transistor, a third transistor, a fourth transistor, and a fifth transistor; wherein a control terminal of the second transistor, a first terminal of the second transistor, and a first terminal of the third transistor are connected to a first low frequency signal port, a control terminal of the third transistor, a second terminal of the second transistor, and a first terminal of the fourth transistor are connected to each other, a second terminal of the third transistor and a first terminal of the fifth transistor are electrically connected to the first node, a control terminal of the fourth transistor and a control terminal of the fifth transistor are electrically connected to the second terminal of the first transistor, and a second terminal of the fourth transistor and a second terminal of the fifth transistor are both electrically connected to a first voltage port.

Further, the first pull-down holding module includes a sixth transistor, a seventh transistor, and an eighth transistor; wherein a control terminal of the sixth transistor, a control terminal of the seventh transistor, and a control terminal of the eighth transistor are electrically connected to the first node, a first terminal of the sixth transistor is electrically connected to the output terminal of the scan driving signal of the current stage, a second terminal of the sixth transistor is electrically connected to a second voltage port, a first terminal of the seventh transistor is electrically connected to the third node, a second terminal of the seventh transistor and a second terminal of the eighth transistor are electrically connected to the first voltage port, and a first terminal of the eighth transistor is electrically connected to an output terminal of the stage transmission signal of the current stage.

Further, the second pull-down holding module includes a ninth transistor, a tenth transistor, and an eleventh transistor; a control terminal of the ninth transistor, a control terminal of the tenth transistor, and a control terminal of the eleventh transistor are electrically connected to the third node, a first terminal of the ninth transistor is electrically connected to the output terminal of the stage transmission signal of the current stage, a first terminal of the tenth transistor is electrically connected to the third node, a second terminal of the ninth transistor and a second terminal of the tenth transistor are electrically connected to the first voltage port, a first terminal of the eleventh transistor is electrically connected to the output terminal of the scan driving signal of the current stage, and a second terminal of the eleventh transistor is electrically connected to the second voltage port.

Further, the second inverting module includes a twelfth transistor, a thirteenth transistor, a fourteenth transistor, and a fifteenth transistor; a first terminal of the twelfth transistor, a first terminal of the thirteenth transistor, and a control terminal of the thirteenth transistor are all connected to a second low frequency signal port, a second terminal of the twelfth transistor and a first terminal of a fourteenth transistor are electrically connected to the second node, a control terminal of the twelfth transistor, a second terminal of the thirteenth transistor, and a first terminal of a fifteenth transistor are connected to each other, a control terminal of the fourteenth transistor and a control terminal of the fifteenth transistor are both connected to the second terminal of the first transistor, and a second terminal of the fourteenth transistor and a second terminal of the fifteenth transistor are both electrically connected to the first voltage port.

Further, the pull-up module includes a sixteenth transistor and a bootstrap capacitor; a first terminal of the sixteenth transistor receives the clock signal, a second terminal of the sixteenth transistor and a second terminal of the bootstrap capacitor are electrically connected to the output terminal of the scan driving signal of the current stage, and a control terminal of the sixteenth transistor and a first terminal of the bootstrap capacitor are electrically connected to the third node.

Further, the pull-down module includes a seventeenth transistor and an eighteenth transistor; a control terminal of the seventeenth transistor and a control terminal of the eighteenth transistor receive the frame start signal, a first terminal of the seventeenth transistor is electrically connected to the third node, a second terminal of the seventeenth transistor is electrically connected to the first voltage port, a first terminal of the eighteenth transistor is electrically connected to the output terminal of the scan driving signal of the current stage, and a second terminal of the eighteenth transistor is electrically connected to the second voltage port.

Further, the drive circuit further includes a nineteenth transistor and a twentieth transistor; a control terminal of the nineteenth transistor is for receiving a reset signal, a first terminal of the nineteenth transistor and a control terminal of the twentieth transistor are both electrically connected to the third node, a second terminal of the nineteenth transistor is electrically connected to the first voltage port, a first terminal of the twentieth transistor receives the clock signal, and a second terminal of the twentieth transistor is electrically connected to the output terminal of the stage transmission signal of the current stage.

Further, a delay time between two of clock signals CKs is 1H.

Further, the drive circuit is provided with twelve clock signals CKs.

Further, the clock signal is at the second level within the image blanking period, and a potential of the third node is reset to a low level, so as to shorten a time for a switching transistor to be affected by a high point voltage or a high current.

According to another aspect of the present disclosure, the present disclosure provides a control method of the drive circuit, the method includes: correspondingly outputting a scan driving signal, a stage transmission signal, a clock signal, and a frame start signal to each of the at least one array substrate row driving unit according to a timing, wherein the clock signal is set to the second level during an image blanking period.

Further, the clock signal is at the second level within the image blanking period, and a potential of the third node is reset to a low level, so as to shorten a time for a switching transistor to be affected by a high point voltage or a high current.

According to another aspect of the present disclosure, there is provided a storage medium in which a plurality of instructions are stored, the instructions are adapted to be loaded by a processor to perform: correspondingly outputting a scan driving signal, a stage transmission signal, a clock signal, and a frame start signal to each of the at least one array substrate row driving unit according to a timing, wherein the clock signal is set to the second level during an image blanking period.

Further, the clock signal is at the second level within the image blanking period, and a potential of the third node is reset to a low level, so as to shorten a time for a switching transistor to be affected by a high point voltage or a high current.

Advantageous Effects

The present disclosure has following advantages: a clock signal is at a second level during an image blanking period, and a potential of a third node is reset to a low level, so as to shorten the time for the switching transistor to be affected by a high point voltage or a high current, and the potential of the third node is pulled down early, thereby preventing a third switching transistor, a fourth switching transistor, a sixteenth switching transistor, and a seventeenth switching transistor from being under the action of the high voltage or the high current for a long time.

DESCRIPTION OF DRAWINGS

The technical solutions and other advantageous effects of this disclosure will become apparent from the detailed description of the specific embodiments of this disclosure with reference to the accompanying drawings.

DETAILED DESCRIPTION OF EMBODIMENTS

Technical solutions in embodiments of the present disclosure will be clearly and completely described below in conjunction with drawings in the embodiments of the present disclosure. Apparently, the described embodiments are only a part of embodiments of the present disclosure, rather than all the embodiments. Based on the embodiments in the present disclosure, all other embodiments obtained by those skilled in the art without creative work fall within the protection scope of the present disclosure.

In the description of the present disclosure, it should be noted that the terms "installation", "connection" and "coupling" should be understood in a broad sense, unless otherwise clearly specified and defined. For example, it can be a fixed connection, a detachable connection, or integrated connection; it can be a mechanical connection, an electrical connection or can communicate with each other; it can be directly connected or indirectly connected through an intermediary, it can also be the connection between two elements or the interaction between two elements. Those ordinary skilled in the art can understand the specific meanings of the above terms in the present disclosure according to specific situations.

Figure 1:
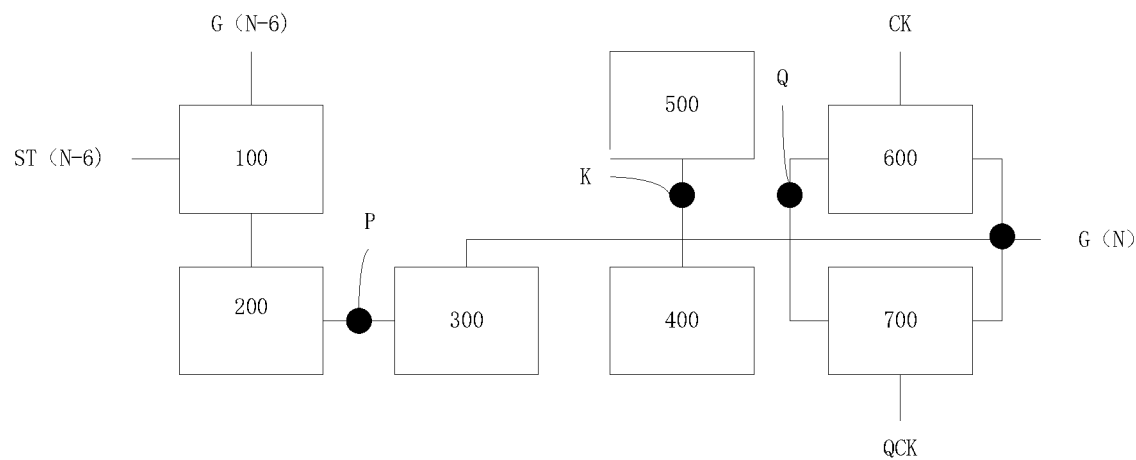
FIG. 1 is a schematic structural diagram of a drive circuit according to a first embodiment of the present disclosure.

As shown in FIG. 1, FIG. 1 is a schematic structural diagram of a drive circuit according to a first embodiment of the present disclosure. The drive circuit includes a plurality of cascaded array substrate row driving units, and the plurality of array substrate row driving units are controlled by a clock signal CK and a frame start signal STV when each frame image is displayed. At least one of the array substrate row driving units includes: a pull-up control module 100, a first inverting module 200, a second inverting module 500, a first pull-down holding module 300, a second pull-down holding module 400, a pull-up module 600, and a pull-down module 700.

For example, the pull-up control module 100 receives a stage transmission signal and a scan driving signal transmitted by the array substrate row driving unit of previous stage, and is electrically connected to the first inverting module 200, the first inverting module 200 and the first pull-down holding module 300 are both electrically connected to a first node P, the second pull-down holding module 400 and the second inverting module 500 are both electrically connected to a second node K, and the pull-up module 600 and the pull-down module 700 are both electrically connected to a third node Q. The pull-down module 700 receives the frame start signal when displaying each frame image, the pull-up module 600 receives the clock signal CK when displaying each frame image and outputs a scan driving signal of the current stage and a stage transmission signal of the current stage, and the first pull-down holding module 300 and the second pull-down holding module 400 are both electrically connected to an output terminal of the stage transmission signal ST of the current stage.

The clock signal has a first level, a second level, and a third level which are periodically set in timing, the potential of the second level is less than the potential of the first level and greater than the potential of the third level, and the clock signal is at the second level during an image blanking period. The first level is a high level, the third level is a low level, and the second level is between the high level and the low level. Since the potential of the third node Q is reset when the potential of the clock signal CK rises, that is, the potential of the third node Q is reduced, the functional performance of the TFT may be improved.

Figure 2:
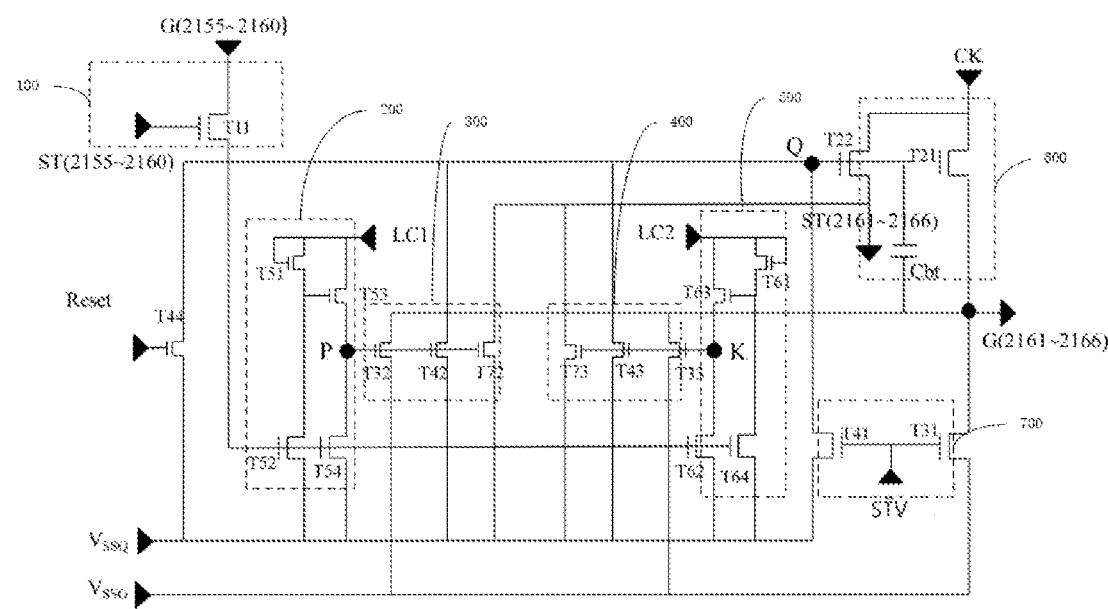
FIG. 2 is a schematic structural diagram of a drive circuit according to a second embodiment of the present disclosure.

As shown in FIG. 2, FIG. 2 is a schematic structural diagram of a drive circuit according to a second embodiment of the present disclosure. The drive circuit includes a plurality of array substrate row driving units that are cascaded, the plurality of array substrate row driving units are controlled by a clock signal CK and a frame start signal STV when displaying each frame image, and at least one of the array substrate row driving units includes a pull-up control module 100, a first inverting module 200, a second inverting module 500, a first pull-down holding module 300, a second pull-down holding module 400, a pull-up module 600, and a pull-down module 700.

For example, the pull-up control module 100 receives the stage transmission signal ST and the scan driving signal G transmitted by the array substrate row driving unit of the previous stage and is electrically connected to the first inverting module, the first inverting module and the first pull-down holding module are both electrically connected to the first node P, the second pull-down holding module and the second inverting module are both electrically connected to the second node K, and the pull-up module and the pull-down module are both electrically connected to the third node Q. The pull-down module 700 receives the frame start signal when displaying each frame image, the pull-up module 600 receives the clock signal CK and outputs the scan driving signal G of the current stage and the stage transmission signal ST of the current stage when displaying each frame image, and the first pull-down holding module 300 and the second pull-down holding module 400 are both electrically connected to the output terminal of the stage transmission signal ST of the current stage.

The clock signal has a first level, a second level, and a third level which are periodically set in timing, the potential of the second level is less than the potential of the first level and greater than the potential of the third level, and the clock signal is at the second level during an image blanking period. The first level is a high level, the third level is a low level, and the second level is between the high level and the low level. Since the potential of the third node Q is reset when the potential of the clock signal CK rises, that is, the potential of the third node Q is reduced, the functional performance of the TFT may be improved.

For example, the pull-up control module 100 includes a first transistor T11. A control terminal of the first transistor T11 receives a stage transmission signal ST transmitted by an array substrate row driving unit of a previous stage, a first terminal of the first transistor T11 receives a scan driving signal G transmitted by an array substrate row driving unit of a previous stage, and a second terminal of the first transistor T11 is electrically connected to the first inverting module.

For example, the first inverting module 200 includes a second transistor T51, a third transistor T53, a fourth transistor T52, and a fifth transistor T54. A control terminal of the second transistor T51, a first terminal of the second transistor T51, and a first terminal of the third transistor T53 are connected to a first low frequency signal port LC1, a control terminal of the third transistor T53, a second terminal of the second transistor T51, and a first terminal of the fourth transistor T52 are connected to each other, a second terminal of the third transistor T53 and a first terminal of the fifth transistor T54 are electrically connected to the first node P, a control terminal of the fourth transistor T52 and a control terminal of the fifth transistor T54 are electrically connected to the second terminal of the first transistor T11, and a second terminal of the fourth transistor T52 and a second terminal of the fifth transistor T54 are both electrically connected to a first voltage port $V_{SSQ}$.

For example, the first pull-down holding module 300 includes a sixth transistor T32, a seventh transistor T42, and an eighth transistor T72. Control terminals of the sixth transistor T32, the seventh transistor T42, and the eighth transistor T72 is electrically connected to the first node P, a first terminal of the sixth transistor T32 is electrically connected to an output terminal of the scan driving signal G of the current stage, a second terminal of the sixth transistor T32 is electrically connected to a second voltage port $V_{SSG}$, a first terminal of the seventh transistor T42 is electrically connected to the third node Q, a second terminal of the seventh transistor T42 and a second terminal of the eighth transistor T72 are electrically connected to the first voltage port $V_{SSQ}$, and a first terminal of the eighth transistor T72 is electrically connected to an output terminal of the stage transmission signal ST of the current stage.

For example, the second pull-down holding module 400 includes a ninth transistor T73, a tenth transistor T43, and an eleventh transistor T33. Control terminals of the ninth transistor T73, the tenth transistor T43, and the eleventh transistor T33 are electrically connected to the second node K. A first terminal of the ninth transistor T73 is electrically connected to the output terminal of the stage transmission signal ST of the current stage. A first terminal of the tenth transistor T43 is electrically connected to the third node Q. A second terminal of the ninth transistor T73 and a second terminal the tenth transistor T43 are electrically connected to the first voltage port $V_{SSQ}$, a first terminal of the eleventh transistor T33 is electrically connected to the output terminal of the scan driving signal G of the current stage, and a second terminal of the eleventh transistor T33 is electrically connected to the second voltage port $V_{SSG}$.

For example, the second inverting module 500 includes a twelfth transistor T63, a thirteenth transistor T61, a fourteenth transistor T62, and a fifteenth transistor T64. A first terminal of the twelfth transistor T63, a first terminal of the thirteenth transistor T61, and a control terminal of the thirteenth transistor T61 are each connected to a second low frequency signal port LC2, a second terminal of the twelfth transistor T63 and a first terminal of the fourteenth transistor T62 are electrically connected to the second node K, a control terminal of the twelfth transistor T63, a second terminal of the thirteenth transistor T61, and a first terminal of the fifteenth transistor T64 are connected to each other, a control terminal of the fourteenth transistor T62 and a control terminal of the fifteenth transistor T64 are both connected to the second terminal of the first transistor T11, and a second terminal of the fourteenth transistor T62 and a second terminal of the fifteenth transistor T64 are both electrically connected to the first voltage port $V_{SSQ}$.

For example, the pull-up module 600 includes a sixteenth transistor T21 and a bootstrap capacitor Cbt. A first terminal of the sixteenth transistor T21 receives the clock signal CK. a second terminal of the sixteenth transistor T21 and a second terminal of the bootstrap capacitor Cbt are electrically connected to the output terminal of the scan driving signal G of the current stage, and a control terminal of the sixteenth transistor T21 and a first terminal of the bootstrap capacitor Cbt are electrically connected to the third node Q.

For example, the pull-down module 700 includes a seventeenth transistor T41 and an eighteenth transistor T31. Control terminals of the seventeenth transistor T41 and the eighteenth transistor T31 receives the frame start signal STV, a first terminal of the seventeenth transistor T41 is electrically connected to the third node Q, a second terminal of the seventeenth transistor T41 is electrically connected to the first voltage port $V_{SSQ}$, a first terminal of the eighteenth transistor T31 is electrically connected to the output terminal of the scan driving signal G of the current stage, and a second terminal of the eighteenth transistor T31 is electrically connected to the second voltage port $V_{SSG}$.

For example, a control terminal of the nineteenth transistor T44 is for receiving a reset signal Reset, a first terminal of the nineteenth transistor T44 and a control terminal of a twentieth transistor T22 are both electrically connected to the third node Q. A second terminal of the nineteenth transistor T44 is electrically connected to the first voltage port $V_{SSQ}$, a first terminal of the twentieth transistor T22 receives the clock signal CK, and a second terminal of the twentieth transistor T22 is electrically connected to the output port of the stage transmission signal ST of the current stage.

Figure 3:
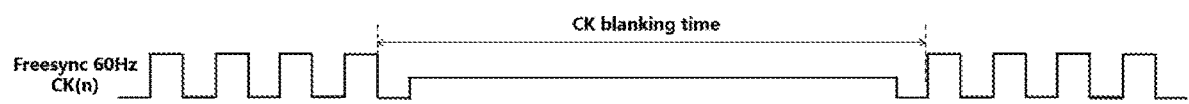
FIG. 3 is a timing diagram of a drive circuit according to an embodiment of the present disclosure.
Figure 4:
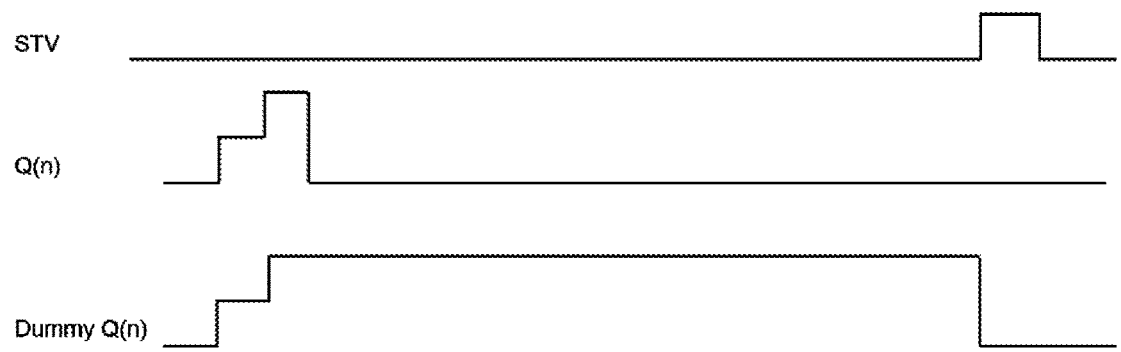
FIG. 4 is a timing diagram of a drive circuit according to an embodiment of the present disclosure.

As shown in FIGS. 3 and 4, taking a display panel including a six-stage Dummy GOA, a resolution of 2160*3180 and tail-stage Dummy (2161-2166) for example, the Dummy GOA unit is also referred to as a virtual shift register, the GOA unit is connected to the gate line located in the display area, and the Dummy GOA unit is not connected to the gate line located in the display area. The drive circuit may be provided with twelve clock signals CKs, and the delay time between two of the clock signals CKs is 1H, where "H" represents the unit of horizontal period, for example, "1H" is equal to one period of the clock signal. At the refresh frequency of the 60 Hz, the CK blanking time period is longer, and the clock signal CK rises to the second level within the CK blanking time, and it can be seen that the potential of the third node Q of the present disclosure decreases earlier than the potential of the Dummy Q of the prior art.

In the present disclosure, the clock signal is at the second level within the image blanking period, and the potential of the third node is reset to the low level, so that the switching transistor is subjected to the high point voltage or the high current for a shortened time, and the potential of the third node is pulled down early, thereby preventing the third switching transistor, the fourth switching transistor, the sixteenth switching transistor, and the seventeenth switching transistor from being under the action of the high voltage or the high current for a long time.

Embodiments of the present disclosure further provide a method of controlling a drive circuit, the method including:
correspondingly outputting a scan driving signal, a stage transmission signal, a clock signal, and a frame start signal to each of the at least one array substrate row driving unit in accordance with timing, and wherein the clock signal is set to the second level during an image blanking period.

In summary, although preferred embodiments have been described above in the present disclosure, the above-mentioned preferred embodiments are not intended to limit the present disclosure. Those of ordinary skilled in the art can make various modifications and changes without departing from the spirit and scope of the present disclosure. Therefore, the protection scope of the present disclosure is subject to the scope defined by the claims.

What is claimed is:

1. A drive circuit for displaying an image, comprising a plurality of array substrate row driving units which are cascaded, wherein for each of the plurality of array substrate row driving units, the array substrate row driving unit is controlled by a clock signal and a same frame start signal when displaying each of frame images, at least one of the array substrate row driving units comprises a pull-up control module, a first inverting module, a second inverting module, a first pull-down holding module, a second pull-down holding module, a pull-up module and a pull-down module;

the pull-up control module receives a stage transmission signal and a scan driving signal transmitted by an array substrate row driving unit of a previous stage and is electrically connected to the first inverting module, the first inverting module and the first pull-down holding module are both electrically connected to a first node, the second pull-down holding module and the second inverting module are both electrically connected to a second node, the pull-up module and the pull-down module are both electrically connected to a third node, the pull-down module receives the frame start signal when displaying the each of the frame images, the pull-up module receives the clock signal and outputs a scan driving signal of a current stage and a stage transmission signal of the current stage when displaying the each of the frame images, and the first pull-down holding module and the second pull-down holding module are both electrically connected to an output terminal of the stage transmission signal of the current stage and an output terminal of the scan driving signal of the current stage;

wherein the clock signal has a first level, a second level, and a third level periodically set in timing, a potential of the second level is less than a potential of the first level and greater than a potential of the third level, and the clock signal is maintained at the second level during an image blanking period, and its waveform is dissimilar to that during a non-image blanking period.

2. The drive circuit according to claim 1, wherein the pull-up control module comprises a first transistor, a control terminal of the first transistor receives the stage transmission signal transmitted by the array substrate row driving unit of the previous stage, a first terminal of the first transistor receives the scan driving signal transmitted by the array substrate row driving unit of the previous stage, and a second terminal of the first transistor is electrically connected to the first inverting module.

3. The drive circuit according to claim 2, wherein the first inverting module comprises a second transistor, a third transistor, a fourth transistor, and a fifth transistor;
a control terminal of the second transistor, a first terminal of the second transistor, and a first terminal of the third transistor are connected to a first low frequency signal port, a control terminal of the third transistor, a second terminal of the second transistor, and a first terminal of the fourth transistor are connected to each other, a second terminal of the third transistor and a first terminal of the fifth transistor are electrically connected to the first node, a control terminal of the fourth transistor and a control terminal of the fifth transistor are electrically connected to the second terminal of the first transistor, and a second terminal of the fourth transistor and a second terminal of the fifth transistor are both electrically connected to a first voltage port.

4. The drive circuit according to claim 3, wherein the first pull-down holding module comprises a sixth transistor, a seventh transistor, and an eighth transistor;
a control terminal of the sixth transistor, a control terminal of the seventh transistor, and a control terminal of the eighth transistor are electrically connected to the first node, a first terminal of the sixth transistor is electrically connected to the output terminal of the scan driving signal of the current stage, a second terminal of the sixth transistor is electrically connected to a second voltage port, a first terminal of the seventh transistor is electrically connected to the third node, a second terminal of the seventh transistor and a second terminal of the eighth transistor are electrically connected to the first voltage port, and a first terminal of the eighth transistor is electrically connected to an output terminal of the stage transmission signal of the current stage.

5. The drive circuit according to claim 4, wherein the second pull-down holding module comprises a ninth transistor, a tenth transistor, and an eleventh transistor;
a control terminal of the ninth transistor, a control terminal of the tenth transistor, and a control terminal of the eleventh transistor are electrically connected to the second node, a first terminal of the ninth transistor is electrically connected to the output terminal of the stage transmission signal of the current stage, a first terminal of the tenth transistor is electrically connected to the third node, a second terminal of the ninth transistor and a second terminal of the tenth transistor are electrically connected to the first voltage port, a first terminal of the eleventh transistor is electrically connected to the output terminal of the scan driving signal of the current stage, and a second terminal of the eleventh transistor is electrically connected to the second voltage port.

6. The drive circuit according to claim 5, wherein the second inverting module comprises a twelfth transistor, a thirteenth transistor, a fourteenth transistor, and a fifteenth transistor;
a first terminal of the twelfth transistor, a first terminal of the thirteenth transistor, and a control terminal of the thirteenth transistor are all connected to a second low frequency signal port, a second terminal of the twelfth transistor and a first terminal of a fourteenth transistor are electrically connected to the second node, a control terminal of the twelfth transistor, a second terminal of the thirteenth transistor, and a first terminal of a fifteenth transistor are connected to each other, a control terminal of the fourteenth transistor and a control terminal of the fifteenth transistor are both connected to the second terminal of the first transistor, and a second terminal of the fourteenth transistor and a second terminal of the fifteenth transistor are both electrically connected to the first voltage port.

7. The drive circuit according to claim 6, wherein the pull-up module comprises a sixteenth transistor and a bootstrap capacitor;
a first terminal of the sixteenth transistor receives the clock signal, a second terminal of the sixteenth transistor and a second terminal of the bootstrap capacitor are electrically connected to the output terminal of the scan driving signal of the current stage, and a control terminal of the sixteenth transistor and a first terminal of the bootstrap capacitor are electrically connected to the third node.

8. The drive circuit according to claim 7, wherein the pull-down module comprises a seventeenth transistor and an eighteenth transistor;
a control terminal of the seventeenth transistor and a control terminal of the eighteenth transistor receive the frame start signal, a first terminal of the seventeenth transistor is electrically connected to the third node, a second terminal of the seventeenth transistor is electrically connected to the first voltage port, a first terminal of the eighteenth transistor is electrically connected to the output terminal of the scan driving signal of the current stage, and a second terminal of the eighteenth transistor is electrically connected to the second voltage port.

9. The drive circuit according to claim 1, wherein the drive circuit further comprises a nineteenth transistor and a twentieth transistor;
a control terminal of the nineteenth transistor is for receiving a reset signal, a first terminal of the nineteenth transistor and a control terminal of the twentieth transistor are both electrically connected to the third node, a second terminal of the nineteenth transistor is electrically connected to the first voltage port, a first terminal of the twentieth transistor receives the clock signal, and a second terminal of the twentieth transistor is electrically connected to the output terminal of the stage transmission signal of the current stage.

10. The drive circuit according to claim 1, wherein a delay time between two of clock signals is 1H.

11. The drive circuit according to claim 1, wherein the drive circuit is provided with twelve clock signals.

12. The drive circuit according to claim 1, wherein the clock signal is at the second level within the image blanking period, and a potential of the third node is reset to a low level, so as to shorten a time for a switching transistor to be affected by a high point voltage or a high current.

13. A control method of a drive circuit, the drive circuit configured for displaying an image, comprising a plurality of array substrate row driving units which are cascaded, wherein for each of the plurality of array substrate row driving units, the array substrate row driving unit is controlled by a clock signal and a same frame start signal when displaying each of frame images, at least one of the array substrate row driving units comprises a pull-up control module, a first inverting module, a second inverting module, a first pull-down holding module, a second pull-down holding module, a pull-up module and a pull-down module;

the pull-up control module receives a stage transmission signal and a scan driving signal transmitted by an array substrate row driving unit of a previous stage and is electrically connected to the first inverting module, the first inverting module and the first pull-down holding module are both electrically connected to a first node, the second pull-down holding module and the second inverting module are both electrically connected to a second node, the pull-up module and the pull-down module are both electrically connected to a third node, the pull-down module receives the frame start signal when displaying the each of the frame images, the pull-up module receives the clock signal and outputs a scan driving signal of a current stage and a stage transmission signal of the current stage when displaying the each of the frame images, and the first pull-down holding module and the second pull-down holding module are both electrically connected to an output terminal of the stage transmission signal of the current stage and an output terminal of the scan driving signal of the current stage;

wherein the clock signal has a first level, a second level, and a third level periodically set in timing, a potential of the second level is less than a potential of the first level and greater than a potential of the third level, and the clock signal is maintained at the second level during an image blanking period, and its waveform is dissimilar to that during a non-image blanking period, wherein the control method comprising:

correspondingly outputting a scan driving signal, a stage transmission signal, a clock signal, and a frame start signal to each of the at least one array substrate row driving unit according to a timing, wherein the clock signal is set to the second level during an image blanking period.

14. The control method according to claim 13, wherein the clock signal is at the second level within the image blanking period, and a potential of the third node is reset to a low level, so as to shorten a time for a switching transistor to be affected by a high point voltage or a high current.

\* \* \* \* \*